United States Patent [19]

Stelly et al.

[11] Patent Number: 4,478,549

[45] Date of Patent: Oct. 23, 1984

[54] FOLDABLE LOADING RAMP FOR ALL TERRAIN/RECREATIONAL VEHICLES AND THE LIKE

[76] Inventors: Curtis Stelly; Elmer J. Arnaud, both of Rte. 1-A, Box Oak 1, Fordoche, La. 70732

[21] Appl. No.: 496,574

[22] Filed: May 20, 1983

[51] Int. Cl.³ .............................................. B65G 67/02
[52] U.S. Cl. .................................. 414/537; 182/104; 193/41
[58] Field of Search .................. 414/537, 538; 193/41; 14/69.5, 71.1; 119/82; 182/104, 156, 194

[56] References Cited

U.S. PATENT DOCUMENTS 1,169,517 1/1916 Silver .................................. 14/71.1
3,504,766 4/1970 Boyd .................................. 182/104
3,737,058 6/1973 Johnson .............................. 414/537

Primary Examiner—Robert G. Sheridan
Attorney, Agent, or Firm—Charles C. Garvey, Jr.

[57] ABSTRACT

Foldable ramp for on and off loading all terrain/recreational vehicles from the rear of trucks, trailers, and vans. The ramp folds longitudinally to a width smaller than the wheelbase of the all terrain/recreational vehicles. When folded it may be slipped between the wheels of the all terrain/recreational vehicle for storage on the bed of the truck, trailer or van. When operational the ramp is engaged against the rear of the truck, trailer or van and allows the operator of the all terrain/recreational vehicle to either ride or push the vehicle onto or off of the truck, trailer, or van.

10 Claims, 5 Drawing Figures

FOLDABLE LOADING RAMP FOR ALL TERRAIN/RECREATIONAL VEHICLES AND THE LIKE

BACKGROUND OF THE INVENTION

1. Field of the Invention

The present invention relates to a portable, folding ramp apparatus suitable for loading all terrain/recreational vehicles into the rear of pick-up trucks, vans and trailers. The present invention more particularly provides a hinged loading ramp that folds longitudinally for storage on the bed of the pick-up truck and which can be often stored between the wheels of the vehicle that has been loaded.

2. General Background

Ramps are commonly used for loading different types of cargo into and off of the rear of trucks, trailers and vans. Some of the cargo includes all terrain/recreational vehicles such as three and four wheeled motorcycles, A.T.V.'s, riding lawn mowers, and small tractors. These vehicles, though small in size are heavy weighing approximately 500 to 1,000 pounds. The vehicles are difficult to load since they usually weigh more than the average person can lift. The present invention is a light weight, foldable loading ramp which can be unfolded and engaged by a single individual. After securing the ramp in place that individual can unaided either on-load or off-load the all terrain/recreational vehicle. The ramp is stable enough to allow the operator of the vehicle to either ride or push the vehicle off or onto the truck, trailer, or van.

The ramp is of such dimensions that once it is folded, its width is smaller than the width of the wheelbase of the all terrain/recreational vehicle. This allows the ramp to be stored on the bed of the truck, trailer or van between the wheels of the all terrain/recreational vehicle.

Several portable ramps have been patented and used commercially.

U.S. Pat. No. 3,613,920 issued to James R. Flamm teaches an auxilliary support structure for a pick-up truck box or the like consisting of a rectangular deck positionable between the sides of the box in overlying relation to the wheel covers and maintained by depending legs units or upwardly extending support straps for providing a full width support surface. An elongated ramp is selectively bracket engaged with the rear end of the deck for the introduction and removal of equipment. The ramp is selectively storable beneath the elevated deck. Vehicles are loaded onto the rectangular deck. The ramp does not fold.

U.S. Pat. No. 4,294,571 issued to Joseph R. Tordella teaches a van platform including a housing for installation upon the floor of a van or truck. The housing includes a first floor located over the van floor to define a storage space therebelow, in which space a ramp is located. The ramp is arranged to be moved out of its retracted position in the housing space to an extended, inclined ramp-functioning position. The ramp includes rollers to facilitate movement of the ramp to the extended position. Upwardly inclined blocks are located within the housing and each includes an indentation for the reception of an associated roller as the ramp reaches a desired position adjacent the top surface of the first floor. The housing includes first locking means to lock the rollers within the associated indentations when the ramp is extended and second means for locking the ramp within the retracted position. The second means is in the form of a releasable handle which is also used to effect the extension of the ramp out of the housing. Cargo is loaded onto the platform and the ramp does not fold.

U.S. Pat. No. 3,517,791 issued to Ray P. Miles teaches a pair of ramps which may be used for loading and unloading cargo from the trucks and the like. The pair of ramps may be used separately to provide flexibility of use. The pair may be used in a parallel engaged position to provide a wider ramp surface for handling wider cargo. Interlock means are provided on each ramp for purposes of engaging the ramp together. The pair of ramps interlock, but are not hinged.

U.S. Pat. No. 3,737,058 issued to Jerold E. Johnson teaches a loading ramp for vehicles comprised of a generally U-shaped frame assembly open at its forward end which engages the rear edge of a truck bed and having a pair of hinged ramp panels swingable from an inwardly and downwardly folded position of use to an upright position of non-use wherein the panels and the frame beams to which they are hingedly attached straddle a load on a truckbed on which the ramp is stored. The ramp does not fold longitudinally for storage under the cargo.

U.S. Pat. No. 3,352,440 issued to M. Wilson teaches a ramp for loading and unloading cargo. This ramp is bracketed onto the rear of a pick-up truck and folds horizontally for storage at the rear of the truck.

British patent No. 402,518 issued to Alfred Henry Lake teaches a ramp that is built up of a number of hinged or attached foldable sections extending for its full length and is fitted to the vehicle body so that when folded the whole ramp can be stowed away in a compartment or cavity of the chassis underneath the floor of the vehicle and when pulled out for use and lowered at its outer end always remains a one-piece part of the body resting thereon for support at its inner end so that one man can extend the ramp for use and stow it away after use.

GENERAL DISCUSSION OF THE PRESENT INVENTION

The preferred embodiment of the apparatus of the present invention is a loading ramp adaptable for use with all terrain/recreational vehicles and the like. It is a device comprising left and right generally rectangular ramp panel sections. At the top of each ramp panel section are a pair of tailgate anchors which can have a resilient material lining the lower surface thereof. The tailgate anchors engage the tailgate of the truck, trailer or van when the ramp is operational. Flexible cables (such as e.g. chains) are attached to each ramp section, forming a tension carrying removable connection extending between each ramp section and the truck, trailer or van to prevent accidental disconnection of the ramp sections from the truck, trailer or van during use. The left and right ramp panel sections are connected together by a hinge assembly at cooperating, abutting mating edges so that they can fold onto each other to reduce the ramp width for storage.

The loading ramp panel sections are adapted to load wheeled vehicles having at least one axle and two wheels (which are spaced a defined wheelbase) attached to the axle. The overall ramp width assembly is greater than the ramp width when folded. The folded ramp width is smaller than the overall operational width so that the wheelbase of a vehicle being loaded accommodates the folded ramp between the two vehicle wheels for storage, such as flat against the bed of the truck, trailer or van.

The loading ramp can be made of light-weight structural materials in order that it may be engaged or stored by one person. Despite being light-weight, materials can be selected which are sturdy enough to allow an individual to ride all terrain/recreational vehicles either up or down the loading ramp. Structural steel, aluminum or the like are preferable materials for constructing the ramp panel sections. The materials chosen may be rust-resistant in order to preserve the life and usefulness of the invention.

The object of this invention is thus to provide a new and improved collapsible apparatus for the loading of all terrain/recreational vehicles and the like into the beds of pick-up trucks, vans, and trailers which is sturdily supported during loading.

A further object of this invention is to provide an apparatus that is light-weight and easy to use, and occupies minimal space when not in use.

A further object of this invention is to provide an apparatus that can be stored on the bed of a pick-up truck, trailer or van between the wheels of the vehicle loaded thereinto.

A further object of this invention is to provide an apparatus which allows the operator of an all terrain/recreational vehicle to either ride or push the vehicle up the loading ramp and into the bed of the pick-up truck, trailer or van.

A further object of this invention is to provide a loading apparatus which attaches quickly to the truck, trailer or van with minimal connection thereto and with no modification thereto.

A further object of this invention is to provide a loading apparatus having lateral and longitudinal stability and support during loading so as to prevent inadvertent disconnection of the ramp from the truck, van or trailer.

BRIEF DESCRIPTION OF THE DRAWINGS

For a further understanding of the nature and objects of the present invention, referenced should be had to the following detailed description, taken in conjunction with the accompanying drawings, in which like parts are given like referenced numerals and wherein.

DETAILED DESCRIPTION OF THE PREFERRED EMBODIMENT

Figure 1:
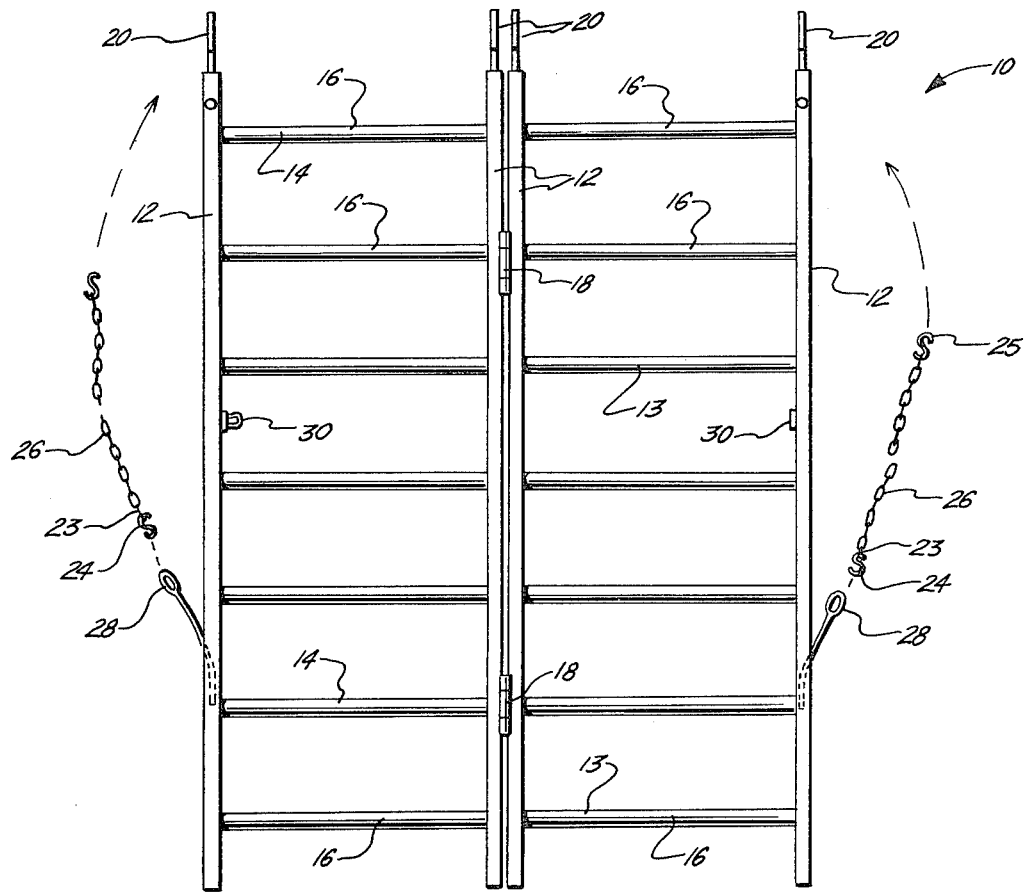
FIG. 1 is a perspective view of the loading ramp of the present invention.
Figure 3:
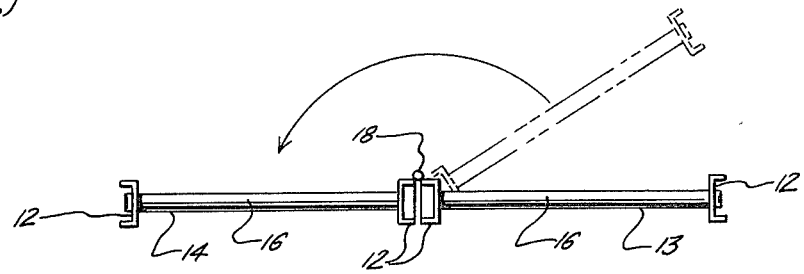
FIG. 3 is a sectional end view of the loading ramp illustrating the manner in which it folds.
Figure 4:
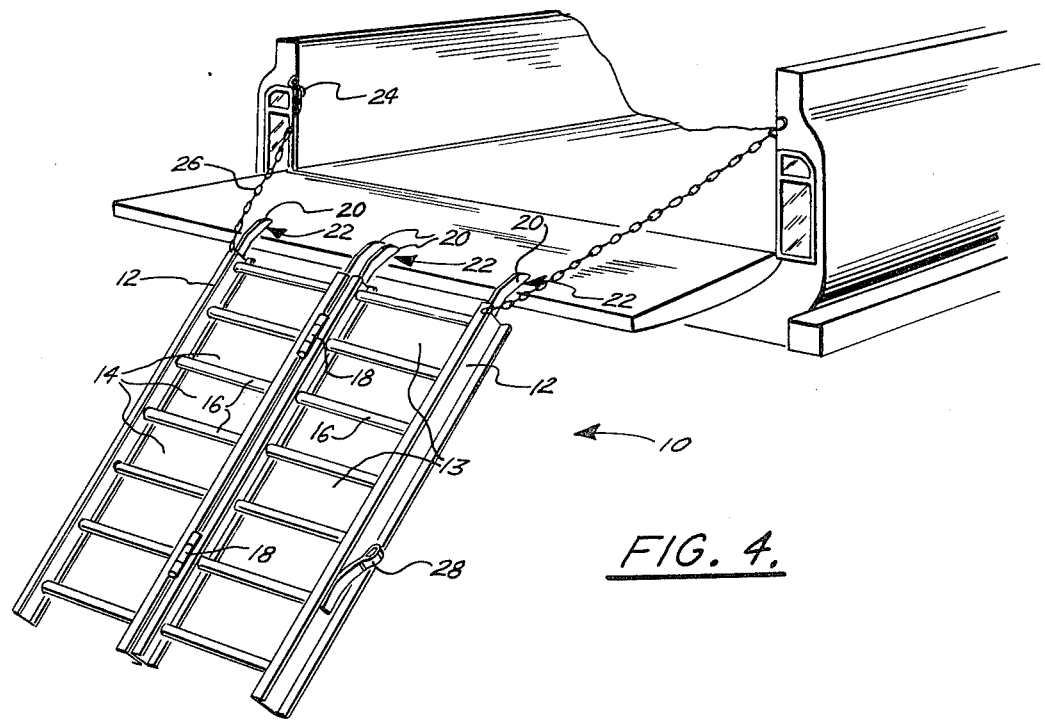
FIG. 4 is a fragmentary perspective view showing the engagement of the top end of the ramp with the tailgate of a pick-up truck, the operational loading position; and, FIG. 5 is a perspective view of the loading ramp in its folded storage position.
Figure 5:
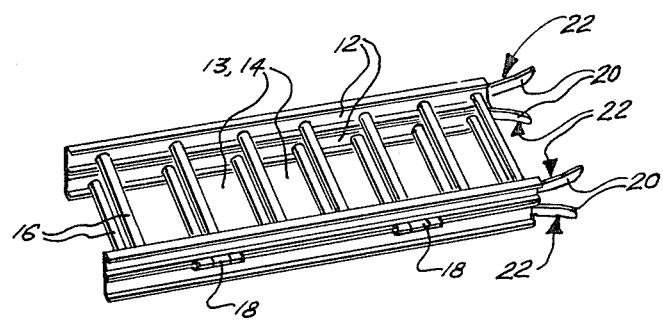

FIGS. 1, 4 and 5 illustrate best the preferred embodiment of the apparatus of the present invention, generally designated by the numeral 10. Loading ramp 10 comprises a pair of left and right generally rectangular ramp panel sections 13, 14 which are hinged to fold upon one another (See FIGS. 3 and 5). Each left and right ramp panel section 13, 14 is a separate structure unit comprising a pair of spaced apart longitudinal beams 12 with horizontal more or less evenly spaced connecting beams 16 spanning transversely between the beams 12. Horizontal beams 16 are preferably welded or otherwise rigidly attached to longitudinal beams 12. Longitudinal beams 12 and horizontal beams 16 are preferably constructed of light-weight rust-resistant but structural materials such as aluminum (FIGS. 1, 4 and 5).

A hinge assembly 18 connects left and right ramp panels 13, 14 together at the mating edges so that they can fold upon each other to reduce the ramp width for storage by one half (See FIGS. 3 and 5). Preferably equal size ramp sections 13, 14 are provided.

Tailgate anchors 20 are welded or otherwise rigidly attached to the top of each longitudinal beam 12 of each ramp panel section 13, 14, and remain therewith. Surface 22 of tailgate anchors 20 can be covered with a resilient and protective linear material that prevents the ramp from moving away from the truck, trailer or van when a load moving onto the truck or trailer engages the ramp. The protective liner material also prevents scratching of the truck, pick-up, van or trailer by anchors 20.

Flexible cables (such as chains) 26 connect the outermost longitudinal beams 12 of each ramp panel section 13, 14 to the truck body. Each cable thus forms a tension carrying, removable connection extending between each ramp panel sections 13, 14 and the truck, trailer or van to prevent accidental disconnection of either ramp panel section 13, 14 (and thus entire ramp assembly 10) from the truck, van or trailer during use. Flexible cables 26 carry tensile load to prevent movement of ramp 10 when a load moving into the truck or trailer engages the ramp because these cables 26 are diagonally positioned, they can carry both longitudinal and lateral load. The end 25 of each flexible cable 26 may be either rigidly or removably attached to the uppermost, outermost portion of the longitudinal beams 12 of each ramp panel section 13, 14.

Figure 2:
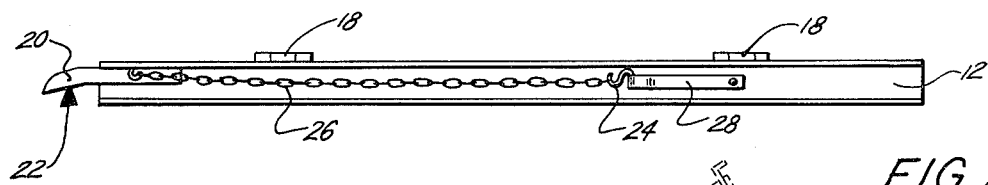
FIG. 2 is a sectional side view of the loading ramp with the safety chain in position for storage.

S-hooks 24 connect to end 23 of flexible cable 26. S-hooks 24 connect cables 26 to the truck, trailer or van when loading ramp 10 is operational. S-hooks 24 connect to eyelets 28 when loading ramp 10 is stored. (See FIGS. 1,2,3). Eyelets 28 are preferably rubber or the like, stretching during the storage of cables 26 to maintain this "stored connection".

Latch 30 connects left and right ramp panels 13, 14 together when they are folded onto one another for storage. Each of two latch halves are provided on the respective outside ramp section beam 12.

What is claimed as the invention is:

1. A foldable ramp for use with trucks and trailers comprising:
   a. left and right generally rectangular ramp panel sections, each providing respectively cooperating, mating edge portions which can join along a longitudinal axis, and transverse top and bottom edges;
   b. left and right tailgate anchor means provided on each ramp section for removably engaging each ramp section top edge to a truck or trailer; and
   c. a hinge assembly that defines the ramp center during use and connects the left and right ramp sections together at the mating edges so that they can fold upon each other to reduce the ramp width for storage;

d. cable means attached to each ramp section for forming a tension carrying removable connection extending between each ramp section and the truck or trailer to prevent accidental disconnection of either ramp section from the truck or trailer during use, said means carrying tensile load to prevent movement of the ramp away from the truck or trailer when a load moving into the truck or trailer engages the ramp.

2. The foldable loading ramp of claim 1 wherein the ramp sections in combination are adapted to load wheeled vehicles having at least one axle and two wheels spaced a defined wheelbase apart and attached to the axle and the overall ramp width upon assembly is greater than the ramp width while the folded ramp width is smaller than the wheelbase so that the folded ramp can be stored between the two vehicle wheels.

3. The apparatus of claim 1 wherein each ramp selection provides means on the ramp edge opposite the mating surfaces for connecting the flexible cable means to the ramp sections.

4. The apparatus of claim 1 wherein each ramp section has inner abutting mating edges and exterior edge surfaces to which the cable means affixes.

5. The apparatus of claim 1 wherein the bracket means is at least one bracket member attached to the top edge of each ramp and forming an angle with the ramp corresponding to the angle formed by the ramp lower edge and abutting ground surface.

6. The apparatus of claim 1, wherein the anchor means comprises a pair of spaced apart brackets attached to the top edge of each ramp section.

7. The apparatus of claim 1, wherein each ramp section comprises a pair of spaced apart longitudinal beams connected by a plurality of connecting beams extending between the longitudinal beams so that each ramp section is a self-supporting structural unit.

8. The apparatus of claim 1, wherein the cable means is one or more flexible chains which are connected during use between the ramp and the truck or trailer being used with the ramp.

9. The apparatus of claim 7, wherein at least one longitudinal beam of one ramp section contacts the longitudinal beam of the other ramp when the ramp sections are folded upon each other.

10. The apparatus of claim 7, wherein the anchor means comprises a support bracket extending from the end of each longitudinal beam.

* * * * *